United States Patent [19]

Angelosanto et al.

[11] 4,127,345
[45] Nov. 28, 1978

[54] LOCK SPINDLE BLIND FASTENER FOR SINGLE ACTION APPLICATION

[75] Inventors: Donald J. Angelosanto; James W. Kendall, both of Huntington Beach, Calif.

[73] Assignee: Huck Manufacturing Company, Detroit, Mich.

[21] Appl. No.: 835,363

[22] Filed: Sep. 21, 1977

[51] Int. Cl.² ............................................. F16B 13/06
[52] U.S. Cl. ........................................ 403/388; 85/70; 85/72; 403/408
[58] Field of Search ................... 85/39, 70, 71, 72, 77, 85/78; 403/388, 408

[56] References Cited

U.S. PATENT DOCUMENTS

| | | | |
|---|---|---|---|
| 2,061,628 | 11/1936 | Huck | 85/70 X |
| 2,526,235 | 10/1950 | Huck | 85/78 |
| 2,887,003 | 5/1959 | Brilmyer | 85/72 |
| 3,047,181 | 7/1962 | Heidenwolf | 85/77 |
| 3,107,572 | 10/1963 | Orloff | 85/70 |
| 3,148,578 | 9/1964 | Gapp | 85/77 |
| 3,277,771 | 10/1966 | Reynolds | 85/72 |
| 3,292,482 | 12/1966 | Fry et al. | 85/78 |
| 3,377,907 | 4/1968 | Hurd | 85/78 |
| 3,377,908 | 4/1968 | Stau et al. | 85/78 |
| 3,461,771 | 8/1969 | Briles | 85/70 |
| 3,880,042 | 4/1975 | Binns | 85/72 |
| 3,915,055 | 10/1975 | Binns | 85/77 |
| 3,937,123 | 2/1976 | Matuschek et al. | 85/72 |
| 4,012,984 | 3/1977 | Matuschek | 85/70 |

FOREIGN PATENT DOCUMENTS

| | | | |
|---|---|---|---|
| 1,906,989 | 2/1973 | Fed. Rep. of Germany | 85/37 |
| 517,709 | 8/1976 | U.S.S.R. | 85/37 |

Primary Examiner—Thomas J. Holko
Attorney, Agent, or Firm—Harness, Dickey & Pierce

[57] ABSTRACT

A lock spindle blind fastener, formed of a suitable, related metal, which includes a mandrel, a sleeve and a locking collar in which the sleeve has a countersunk head having an under head included angle greater than the included angle of the as-prepared hole and in which the sleeve head has a straight counterbore for the initial reception of the locking collar, communicating with an entrant resistance angle for reception of the collar during setting. Such entrant resistance angle is less than the under head angle. The relationship of these angles is such as to permit the use of a single action, or non-shifting head, setting tool. Also, such angular relationship assures an effective lock between the mandrel, or spindle, and the sleeve when the fastener has been set.

3 Claims, 7 Drawing Figures

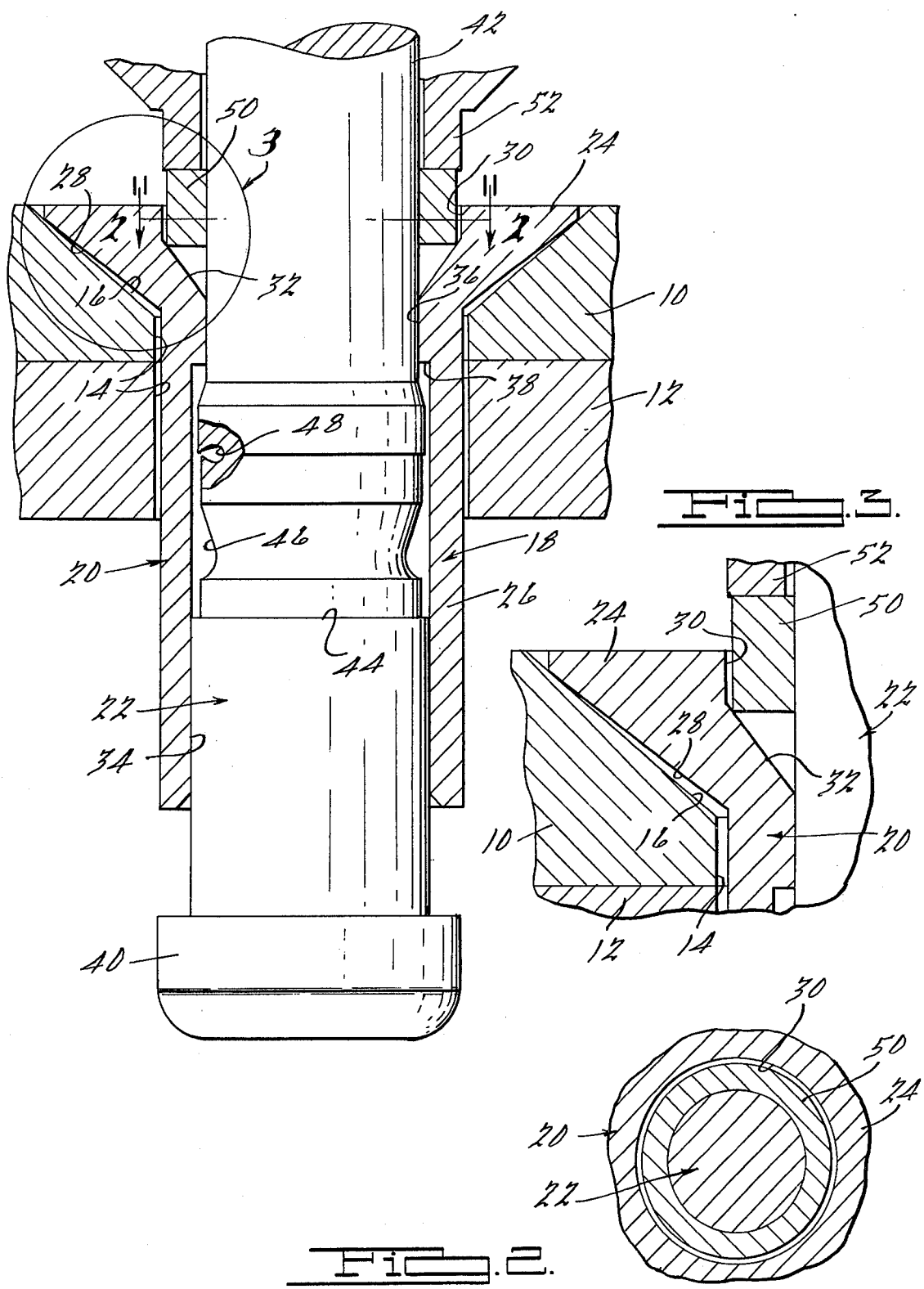

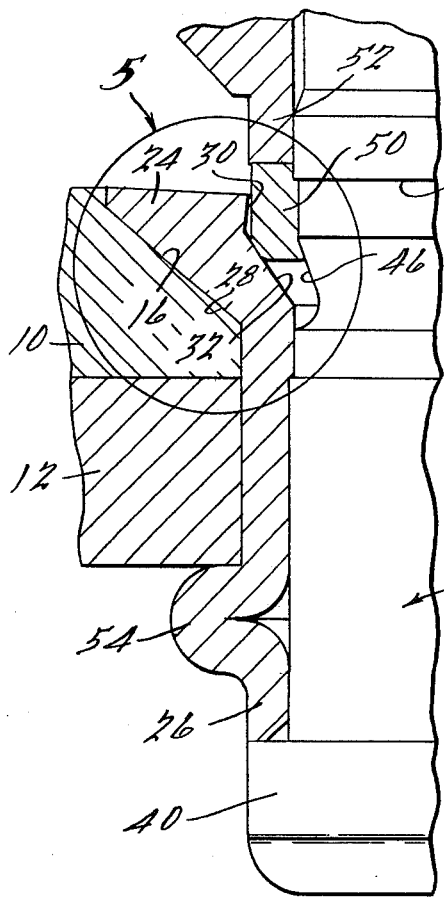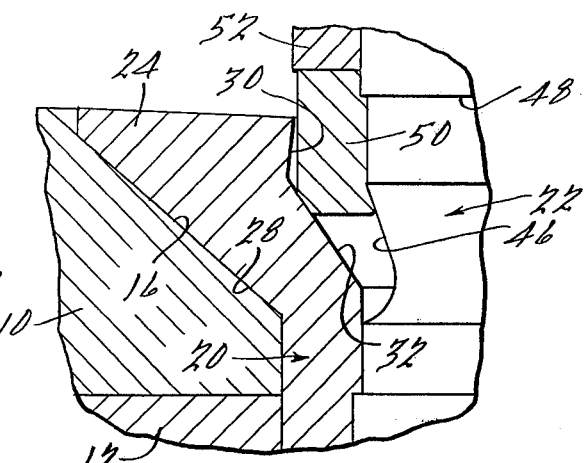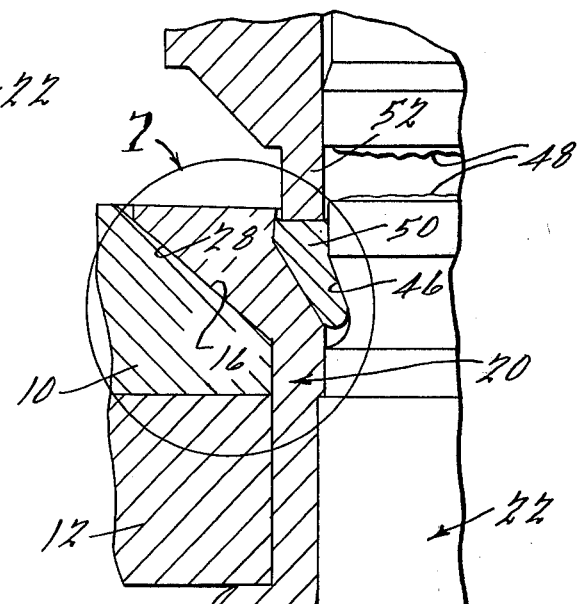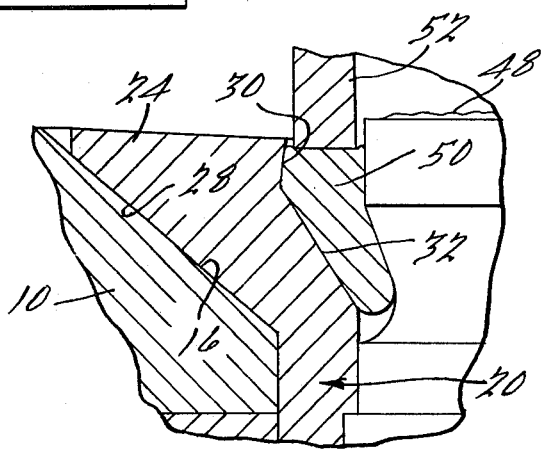

LOCK SPINDLE BLIND FASTENER FOR SINGLE ACTION APPLICATION

BACKGROUND OF THE INVENTION

Lock-spindle blind fasteners, of the pull type, are generally of two types. One in which the fastener is constructed to be set by a double-action tool and the other constructed to be set by a single action tool. The fastener of this invention is of this latter type. Both type of tools are well known in the fastener art.

Fasteners constructed to be set by a single action tool have had a problem of so supporting a locking collar before and during the initial setting of the fastener that the collar will not cock or be improperly displaced causing binding against the mandrel and a malfunction in the final setting of the fastener.

Also, conventional countersinks in "as-prepared" holes are 100° plus or minus 1°. With prior conventional 100° head rivets, also plus or minus 1° tolerance, it is possible to have a 99° fastener head in a 101° installation hole, resulting in a loss of peripheral head contact with the countersink of the hole and creating potential sites for corrosion.

The under angle of the fastener head as related to the initial straight counterbore in the sleeve and to the entrant resistance angle for reception of the collar assure that there is full peripheral contact between the countersunk hole and the underside of the sleeve head and that the inter-lock between the sleeve and the mandrel is properly accomplished when set with a single action tool.

SUMMARY OF THE INVENTION

The sleeve of the present invention has a countersunk head configuration and a longitudinal, central tubular opening therethrough for the reception of the spindle or mandrel. The underside of the sleeve head is formed with an included angle of 106°, plus or minus 2° and is received within a countersunk hole of the work piece in which the countersunk hole portion is conventionally 100°, plus or minus 1°. There is thus an angular relationship between these facing surfaces of approximately 6° from the outside in, before the fastener is set.

The longitudinal bore of the sleeve head has a straight-wall counterbore of approximately 0.015 inch and a communicating lock collar entry resistance angle of approximately 80°.

The mandrel is received within the bore of the sleeve and has a head on its blind end adapted to engage the inner or blind end of the sleeve and form the blind head when the rivet is set, as in the prior art.

The mandrel is formed with a concealed break notch and a lock pocket, both known in the prior art.

A ring shaped lock collar embraces the projecting end of the mandrel and initially seats within the straight counterbore in the head of the sleeve. The projecting end of the lock collar is engaged by the nose of the setting tool and as the mandrel is pulled the reaction force of the nose presses the lock collar inwardly of the sleeve. The collar abuts against the entry resistance angle of the sleeve and movement into the lock pocket is restrained until the mandrel reaches the end of its pull stroke when the collar is forced into the lock pocket of the mandrel.

During this setting, the collar is retained in proper position against tipping and causing binding against the mandrel and thus holding-off against premature locking. Only when the lock pocket is in proper position will the collar be received in the pocket.

During this setting the undersurface of the fastener head is formed flush against the wall of the hole, and this reforming movement causes the straight counterbore of the sleeve to deflect angularly over the end of the lock collar to form an additional lock against outward displacement of the collar.

The following patents are the closest prior art known to applicant:

U.S. Pat. No. 3,148,578 — R. H. GAPP, Rivet and Method of Riveting.

U.S. Pat. No. 3,292,482 — B. A. G. FRY et al., Self-Plugging Blind Fastening Device.

U.S. Pat. No. 3,377,907 — R. L. HURD, Blind Fastener.

U.S. Pat. No. 3,915,055 — LLOYD SYLVESTER BINNS, Blind Rivet Having Counterbored Sleeve Head of Double-Angle Configuration.

U.S. Pat. No. 3,937,123 — JOSIP MATUSCHEK, JOHAN AUGUST LOUW, Blind Fastener with Shear Washer.

U.S. Pat. No. 4,012,984 — JOSIP MATUSCHEK, Blind Rivet Assembly with Locking Collar On Rivet Stem.

The present invention distinguishes over these patents by the relative angles in the sleeve head as also related to the lock collar and the lock pocket producing beneficial results not obtained in the prior patents.

Advantages over the prior art are due primarily to the relative differences between the angle of the countersink in the work, the angle of the under surface of the sleeve head, the straight counterbore, and angle of the collar entrance resistance angle.

In the setting of the fastener the head is reformed and deflected over the set lock collars. This produces consistent peripheral head contact and allows greater angular tolerance of the drilled countersink. Also, the collar resistance angle provides hold-off due to increased mechanical advantage to firmly seat the lock collar in installation while allowing the use of a single-action or non-shifting pulling head. Also, reforming of the straight wall counterbore provides collar containment to keep collar in alignment, and prevent binding prior to angular deflection and upon deflection provides back taper to further lock the collar.

BRIEF DESCRIPTION OF DRAWINGS

FIG. 1 is a vertical cross-sectioned view, with parts in elevation, of a fastener according to the present invention showing such fastener installed in pre-prepared openings in work pieces to be secured together and showing the lock-collar of the fastener engaged by the nose of an installation tool prior to setting, of the fastener;

FIG. 2 is a cross-sectioned view taken substantially along the line 2—2 of FIG. 1;

FIG. 3 is an enlarged view taken within the circle 3 of FIG. 1.

FIG. 4 is a partial view similar to FIG. 1 and showing the fastener in an intermediate stage in the setting;

FIG. 5 is an enlarged view within the circle 5 of FIG. 4;

FIG. 6 is a view similar to FIGS. 1 and 4 and showing the fastener as finally set; and FIG. 7 is an enlarged view within the circle 7 of FIG. 6.

DESCRIPTION OF THE PREFERRED FORM OF THE INVENTION

Referring to FIG. 1, work pieces to be secured together are shown at 10 and 12, having aligned openings 14. The outer work piece 10 has a counter sunk opening 16 which is conventionally 100° plus or minus 1°.

The fastener of the present invention is generally indicated at 18 and comprises a sleeve generally indicated at 20 and a mandrel generally indicated at 22.

The sleeve 20 includes a countersunk head 24 having an integral longitudinal extending tubular body section 26.

The under surface 28 of the countersunk head 24 is formed with an included angle 106° plus or minus 2°.

The head 24 is formed with an entrant, straight wall counter bore 30 which has a depth of about 0.015 inch. The wall section 30 communicates with an annular entry resistance angle 32 which has an included angle of about 80°.

The inwardly projecting end of the sleeve 26 has a central opening 34 terminating adjacent its upper end with a cylindrical portion 36 of smaller internal diameter which forms an annular stop shoulder 38.

The mandrel 22 is disposed within the sleeve 20 for longitudinal movement therein and is formed with an annular head 40 at its inner end which is adapted to abut the inner end of the sleeve 20 in the formation of the blind head.

The opposite end of the mandrel projects beyond the head of the sleeve as indicated at 42. This projecting end is adapted to be engaged by a pull gun in the usual way. The mandrel 22 is formed with an annular shoulder 44 which provides a stop shoulder adapted to abut the cooperating stop shoulder 38 on the sleeve to thus limit the movement of the mandrel 22.

An annular lock pocket 46 is also formed in the mandrel between the stop shoulder 44 and a concealed or closed annular break notch 48. Such break notch is known in the Prior Art as disclosed in Fry U.S. Pat. No. 3,292,482.

An annular ring shaped lock collar 50 embraces the mandrel and is disposed within the counterbore 30. The engagement between the wall of the counterbore 30 and the surface of the lock collar assures that the lock collar will be held in straight alignment during the setting of the fastener.

The sequence of operation in the setting of the fastener are shown in the comparison of FIGS. 1, 4, and 6 and their related enlarged sections.

In FIG. 1 the fastener 18 is shown as having been inserted in the openings 14 with the countersunk head 24 substantially flush with the outer surface of the part or panel 10 and with the under surface 28 adjacent and facing the countersink 16.

The outer end of the lock collar is engaged by the abutting end of a nose piece 52 of a conventional, single action, pull type installation tool. Only the nose portion of such installation tool is illustrated but its construction and function are well known in the art. Generally speaking, the projecting end 42 of the mandrel is engaged within the installation tool to pull the mandrel and applying a reaction force against the lock collar 50 by the abutting nose piece 52.

In the initial position, as best illustrated in the enlarged FIG. 3, the under surface of the countersunk head 28 is only in annular engagement with the countersink surface 16 adjacent the outer end, there being a space between such surfaces adjacent the inner end due to the difference in the included angles of each surface.

The lock collar 50 is received within the straight counterbore 30 and while in the illustration a slight spacing is shown, the fit is such that the collar 50 is supported by the wall of such counterbore 30 and embraces the mandrel 22. The inner end of the collar thus rests against the angular wall 32.

Referring to FIGS. 4 and 5, an intermediate stage in the setting sequence is illustrated. At this stage the mandrel 22 has been pulled and the nose 52 has reacted to push the lock collar inwardly. Also at this stage, the blind bulbed head 54 has been formed and the stop shoulder 44 has abutted the shoulder 38. The angular surface 42 has resisted the inward movement of the collar so as to hold-off premature locking by the collar 50.

As the pull on the mandrel continues, with a build-up in the reaction force of the nose 52 against the lock collar, the lock collar is forced into the lock pocket 46. More importantly, as this setting continues the head 24 of the sleeve is reformed so that the surface 28 is reformed into full annular contact with the bore 16 throughout their lengths; and at the same time, the head is also deflected to cause a back taper of the counterbore 30 of about 3°.

The effect of such movement is best shown by comparison of the enlarged FIGS. 3, 5, and 7 where it will be seen that the surfaces 16 and 28 are in full peripheral engagement throughout the length of the counterbore and also that the wall 30 which had been straight has in effect been hooked over the outer end of the lock collar 50 because of the back taper. The collar 50 has been reshaped in being forced into the lock pocket as best shown in FIGS. 5 and 7. The lock collar has thus been additionally locked against outward displacement.

We claim:

1. In combination, an inner part having an opening provided therein, an outer part having a conventional countersunk opening provided therein and positioned in aligned relationship with said inner part opening, a pull type blind fastening for use in connecting said inner and outer parts, said fastening comprising a tubular sleeve and a mandrel positioned for longitudinal movement therein to form a blind head on the sleeve, said sleeve having a countersunk head in which the under surface has an included angle greater than the included angle of the countersunk opening, said head having an entrant straight wall counterbore terminating in an inwardly directed entry resistance angle less than the included angle of said countersunk head, said mandrel having an annular lock pocket, and an annular lock collar positioned to embrace said mandrel within said straight wall counterbore and adapted to be moved into said lock pocket along said entry angle while said under surface of said countersunk head is moved against said countersunk opening and said straight wall counterbore is deflected by said movement of said countersunk head against said countersunk opening to form a back taper over the end of the lock collar when the fastener is set.

2. The combination of claim 1 in which said conventional countersunk opening is approximately 100°, in which the included angle of the under surface of the countersunk head is approximately 106°, in which the included angle of the entry resistance angle is approximately 80°.

3. The combination of claim 2 in which the back taper of the straight wall counterbore is approximately 3° when the fastener is set.

* * * * *